(12) United States Patent
Ishida

(10) Patent No.: US 8,205,710 B2
(45) Date of Patent: Jun. 26, 2012

(54) BELT-TYPE CONTINUOUSLY VARIABLE TRANSMISSION HAVING RESIN BLOCK BELT AND MOTORCYCLE INCLUDING BELT-TYPE CONTINUOUSLY VARIABLE TRANSMISSION

(75) Inventor: Yousuke Ishida, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 72 days.

(21) Appl. No.: 12/018,008

(22) Filed: Jan. 22, 2008

(65) Prior Publication Data

US 2008/0314676 A1    Dec. 25, 2008

(30) Foreign Application Priority Data

Jan. 26, 2007    (JP) ................................. 2007-016491

(51) Int. Cl.
*F01N 1/04* (2006.01)
(52) U.S. Cl. ........ 180/366; 181/265; 454/346; 180/225; 180/381
(58) Field of Classification Search .................. 180/219, 180/225, 230, 231, 309, 344, 346, 357, 366, 180/373; 474/144; 74/606 R, 606 A, 607; 181/104, 252, 256; 454/143, 346, 906
See application file for complete search history.

(56) References Cited

U.S. PATENT DOCUMENTS

| | | | | |
|---|---|---|---|---|
| 4,362,223 A | * | 12/1982 | Meier | 181/206 |
| 5,560,446 A | * | 10/1996 | Onishi | 180/219 |
| 5,970,963 A | * | 10/1999 | Nakase et al. | 123/590 |
| 6,155,224 A | * | 12/2000 | Akihisa et al. | 123/184.57 |
| 6,547,024 B2 | * | 4/2003 | Ohyama et al. | 180/227 |
| 6,557,438 B2 | * | 5/2003 | Maeda et al. | 74/606 R |
| 6,848,410 B2 | * | 2/2005 | Hoffmann et al. | 123/184.57 |
| 6,920,959 B2 | * | 7/2005 | Han et al. | 181/224 |
| 6,945,355 B2 | * | 9/2005 | Ludwig et al. | 181/224 |
| 7,131,514 B2 | * | 11/2006 | Choi et al. | 181/270 |
| 7,159,557 B2 | * | 1/2007 | Yasuda et al. | 123/184.57 |
| 7,191,881 B2 | * | 3/2007 | Tsukada et al. | 192/45 |
| 7,487,853 B2 | * | 2/2009 | Ishida et al. | 180/219 |

(Continued)

FOREIGN PATENT DOCUMENTS

EP    1164263 A1    12/2001

(Continued)

OTHER PUBLICATIONS

Hiroaki Fujiwara, Cooling Structure for Dry Type Continuously Variable transmission, Dec. 22, 1997, Japanese Patent Office, JP 09-329217, English machine translation of description.*

(Continued)

*Primary Examiner* — Joseph Rocca
*Assistant Examiner* — James English
(74) *Attorney, Agent, or Firm* — Keating & Bennett, LLP

(57) ABSTRACT

A belt-type continuously variable transmission that prevents escape of noise generated by a resin block belt to the outside. The resin block belt is wound around a primary sheave and a secondary sheave. A transmission case defines a belt chamber accommodating the primary sheave, secondary sheave, and resin block belt. The transmission case includes an exhaust passage, intake passages, and a sound absorbing member. The sound absorbing member is attached to an inner wall of the exhaust passage in a position to collide with sound waves traveling through the exhaust passage. The sound absorbing member has a sound absorbing surface crossing an extending direction of the exhaust passage.

14 Claims, 17 Drawing Sheets

U.S. PATENT DOCUMENTS

| | | | |
|---|---|---|---|
| 2002/0005191 A1 | 1/2002 | Maeda et al. | |
| 2004/0171449 A1* | 9/2004 | Oishi et al. | 474/144 |
| 2005/0229742 A1* | 10/2005 | Komura et al. | 74/606 R |
| 2006/0006016 A1* | 1/2006 | Nishizawa | 180/219 |
| 2006/0038667 A1* | 2/2006 | Kitayama | 340/438 |
| 2006/0172839 A1* | 8/2006 | Masuda et al. | 474/144 |
| 2008/0023264 A1* | 1/2008 | Pacini et al. | 181/237 |

FOREIGN PATENT DOCUMENTS

| | | | |
|---|---|---|---|
| EP | 1201535 | A2 | 5/2002 |
| JP | 06010661 | A * | 1/1994 |
| JP | 07248054 | A * | 9/1995 |
| JP | 09329217 | A | 12/1997 |
| JP | 2002-147582 | | 5/2002 |
| JP | 2002147582 | A | 5/2002 |
| JP | 2005291273 | A * | 10/2005 |
| JP | 2005306169 | A * | 11/2005 |
| JP | 2006029486 | A * | 2/2006 |

OTHER PUBLICATIONS

Akihiro Kamitsuji, Cooling Device for Belt-type Continuously Variable Transmission, Oct. 20, 2005, JPO, JP 2005-291273 A, English Abstract.*

Akihiro Kamitsuji, Cooling Device for Belt-type Continuously Variable Transmission, Oct. 20, 2005, JPO, JP 2005-291273 A, Machine translation of Specification.*

Koichiro Nokura, Cooling Device of Continuously Variable Transmission, Sep. 26, 1995, JPO, JP 7-248054 A, English Abstract.*

Koichiro Nokura, Cooling Device of Continuously Variable Transmission, Sep. 26, 1995, JPO, JP 7-248054 A, Machine translation of Specification.*

Masao Takashima, Exhaust Muffler of Motorcycle, Jun. 30, 1992, JPO, JP 06-010661 A, English Abstract.*

Masao Takashima, Exhaust Muffler of Motorcycle, Jun. 30, 1992, JPO, JP 06-010661 A, Machine Translation of Description.*

European Search Report for corresponding European application 08250290.7 lists the references above.

* cited by examiner (a)

(b)

BELT-TYPE CONTINUOUSLY VARIABLE TRANSMISSION HAVING RESIN BLOCK BELT AND MOTORCYCLE INCLUDING BELT-TYPE CONTINUOUSLY VARIABLE TRANSMISSION

RELATED APPLICATIONS

This application claims the benefit of priority under 35 USC 119 of Japanese patent application no. 2007-016491, filed on Jan. 26, 2007, which application is hereby incorporated by reference in its entirety.

BACKGROUND OF THE INVENTION

1. Field of the Invention

The present invention relates to a belt-type continuously variable transmission having a resin block belt, and a motorcycle including this belt-type continuously variable transmission.

2. Description of Related Art

JP-A-2002-147582, for example, discloses a motorcycle which includes a belt-type continuously variable transmission having a resin block belt. The resin block belt has a higher durability than that of a conventional rubber belt, and a belt-type continuously variable transmission that uses the resin block belt therefore has a higher durability as well.

A resin block belt is formed by combining a plurality of resin blocks having a higher hardness than that of rubber. Thus, the sound generated by collisions between a resin block belt and a primary or a secondary sheave is larger than the sound generated by collisions between a rubber belt and the primary or secondary sheave. Thus, noise generated from a belt-type continuously variable transmission using a resin block belt is greater than noise generated from a belt-type continuously variable transmission using a rubber belt.

In order to reduce the noise generated by the resin block belt, JP-A-2002-147582 considers a structure that includes a sound absorbing material disposed inside and outside a transmission case. However, even when sound absorbing material is provided inside and outside the transmission case, it is difficult to sufficiently prevent escape of noise generated by the resin block belt to the outside.

SUMMARY OF THE INVENTION

The invention has been developed to solve these problems and provides a structure that sufficiently prevents escape of noise generated by a resin block belt to the outside.

A belt-type continuously variable transmission according to one aspect of the invention includes a resin block belt wound around primary and secondary sheaves. A transmission case defines a belt chamber accommodating the primary sheave, the secondary sheave, and the resin block belt. The transmission case includes an air passage connecting the inside and the outside of the belt chamber, and a sound absorbing member. The sound absorbing member is attached to an inner wall of the air passage and is disposed in a position to collide with sound waves traveling from the inside toward the outside of the belt chamber.

A belt-type continuously variable transmission according to another aspect of the invention includes a resin block belt wound around primary and secondary sheaves. A transmission case defines a belt chamber accommodating the primary sheave, the secondary sheave, and the resin block belt. The transmission case includes an air passage communicating with the belt chamber, and a sound absorbing member. The sound absorbing member is attached to an inner wall of the air passage. The sound absorbing member has a sound absorbing surface crossing an extending direction of a portion of the air passage upstream from the sound absorbing member.

The present invention sufficiently prevents escape of noise generated by the resin block belt to the outside.

Other features and advantages of the invention will be apparent from the following detailed description, taken in conjunction with the accompanying drawings which illustrate, by way of example, various features of embodiments of the invention.

DETAILED DESCRIPTION OF THE INVENTION

The present inventors found that the main component of noise generated from a belt-type continuously variable transmission having a resin block belt is pitch noise produced by sequential shifts of plural resin blocks. In addition, they found that the pitch noise is a high-frequency sound. Furthermore, they directed their attention to the fact that high-frequency sound generally has such characteristics as high rectilinear propagation and low penetrability. Based on these findings, the inventors have developed the invention described herein.

When an air passage communicating with a belt chamber extends in a straight direction, the high-frequency sound having high rectilinear propagation escapes chiefly through the air passage to the outside. Considering this fact, according to the invention, a sound absorbing material is attached to an inner wall of the air passage connecting the inside and outside of the belt chamber in such a position that sound waves traveling through the air passage collide with the sound absorbing material. This arrangement of the sound absorbing material effectively prevents escape of high-frequency sound generated by the resin block belt from the belt chamber.

According to this embodiment, a bended portion is formed on the air passage for effectively preventing the escape of high-frequency sound. More specifically, a plurality of bended portions is formed on an exhaust passage, and the sound absorbing materials are provided on the bended portions.

Additional sound absorbing materials may be affixed to the inside and outside of a transmission case for further reducing escape of noise to the outside. However, because high-frequency sound has characteristics of high rectilinear propagation and comparatively low penetrability through an object, noise generated by the resin block belt can be effectively prevented by disposing sound absorbing material within the air passage in such a position that the main flow of air traveling through the air passage collides with the sound absorbing material, even when sound absorbing materials are not affixed to the inside and outside of the transmission case. That is, sound from the belt chamber is effectively prevented and the size of the belt-type continuously variable transmission is reduced by attaching sound absorbing material to the inside wall of the air passage such that the main flow of air passing through the air passage collides with the sound material, and by eliminating sound absorbing materials affixed to the inside and outside of the transmission case. Moreover, the cooling effect inside the transmission case can be is enhanced by eliminating sound absorbing materials affixed to the area having thermal insulation effect and the inside and outside of the transmission case. As a result, the life of the belt-type continuously variable transmission is prolonged.

Figure 1:
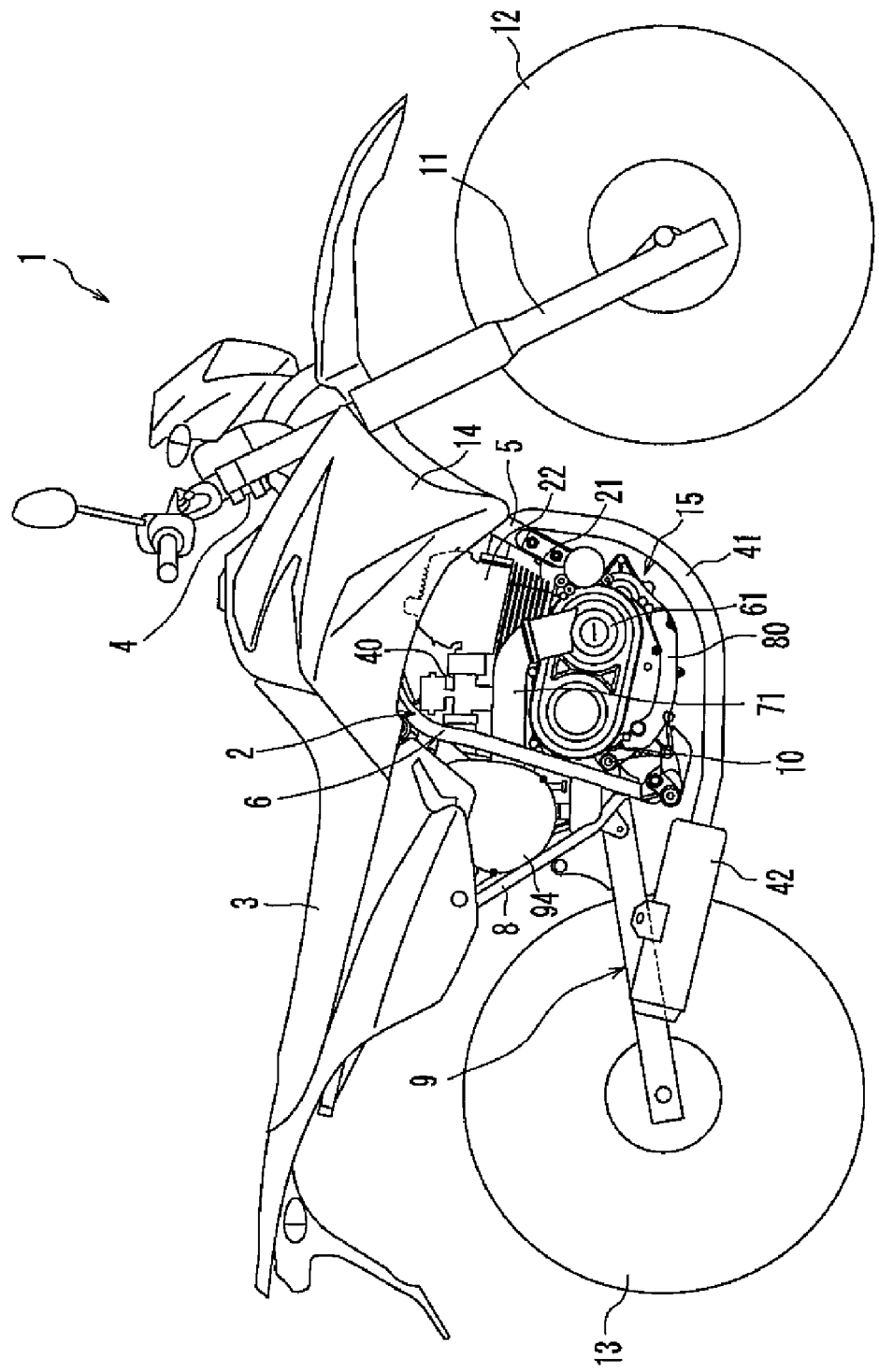
FIG. 1 is a right side view of a motorcycle according an embodiment of the invention.

A motorcycle 1 according to this embodiment is now described with reference to FIGS. 1-13. Motorcycle 1 shown in FIG. 1 is an off-road type motorcycle and is discussed as one example of a straddle-type vehicle according to the invention. However, the invention is not so limited and encompasses straddle-type vehicles of other types such as motorcycle types, motor-scooter types, moped types and other types. The invention is also applicable to straddle-type vehicles other than motorcycles. For example, the invention may be applied to an all terrain vehicle (ATV).

<<General Structure of Motorcycle 1>>

FIG. 1 is a side view of motorcycle 1. In the following description, the front-rear and left-right directions are from the perspective of a rider sitting on a seat 3.

Motorcycle 1 has a body frame 2, a body cover 14, and seat 3. Body cover 14 covers a part of body frame 2. Seat 3 is attached to body cover 14.

Body frame 2 has a steering head pipe 4, a down tube 5, and a main pipe 6. Down tube 5 is extended downward from steering head pipe 4, bended at an intermediate portion, and further extended substantially in the horizontal direction from the intermediate portion. Main pipe 6 positioned above down tube 5 extends toward the rear from steering head pipe 4.

A pivot shaft 10 is attached to the lower end of main pipe 6. A rear arm 9 extending toward the rear is attached to pivot shaft 10 such that rear arm 9 can swing. A rear wheel 13 is rotatably attached to the rear end of rear arm 9. The lower end of steering head pipe 4 is connected with a front fork 11. A front wheel 12 is rotatably attached to the lower end of front fork 11.

Figure 2:
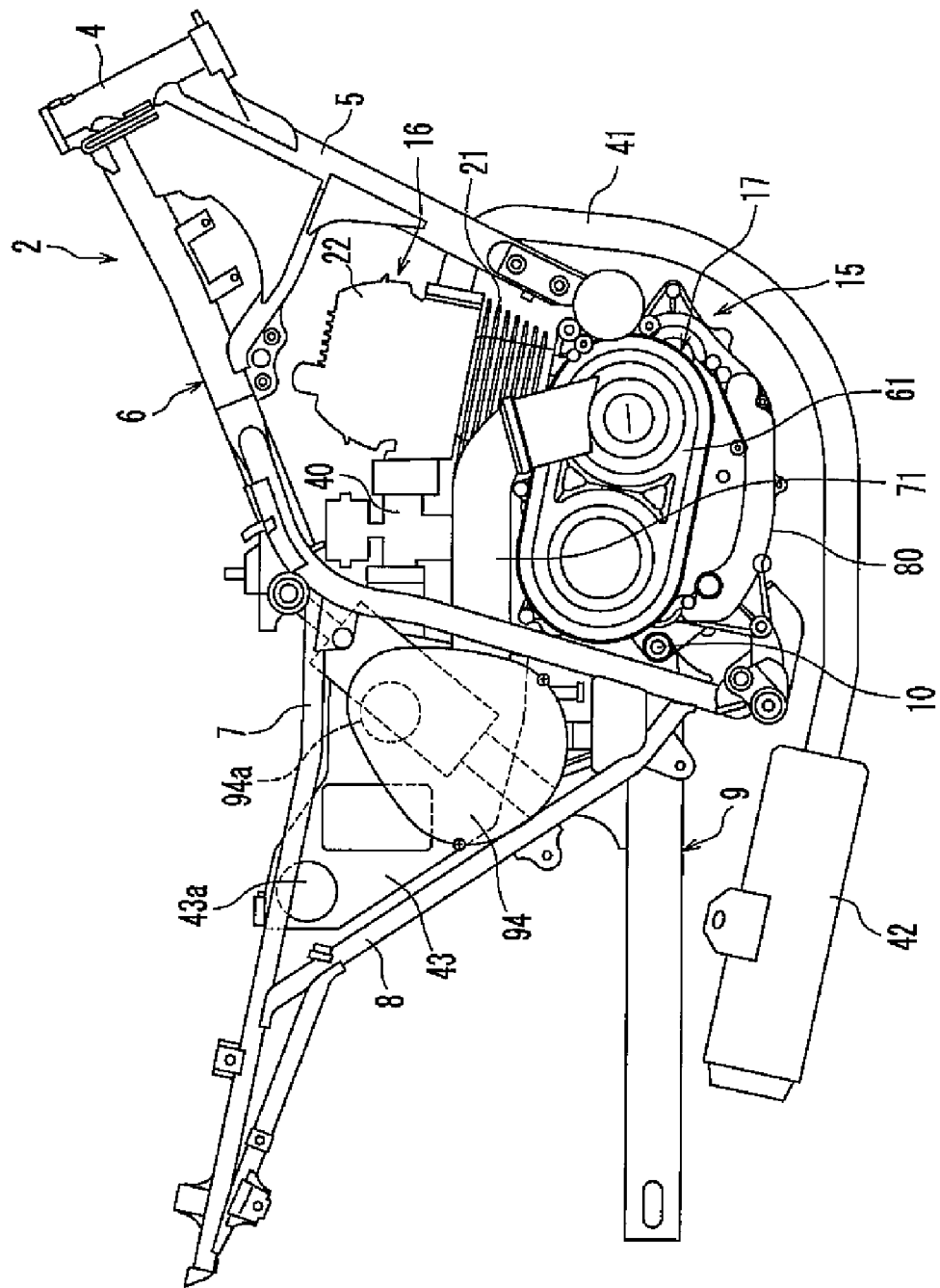
FIG. 2 is a right side view of a central portion of the motorcycle of FIG. 1.

As illustrated in FIG. 2, a pair of seat rails 7 extending toward the rear are provided at an intermediate portion of main pipe 6. A back stay 8 is connected with a position slightly shifted toward the rear from the centers of seat rails 7. Back stay 8 extends diagonally downward toward the front from its connection with seat rails 7. The distal end of back stay 8 is connected with the lower end of main pipe 6.

Figure 3:
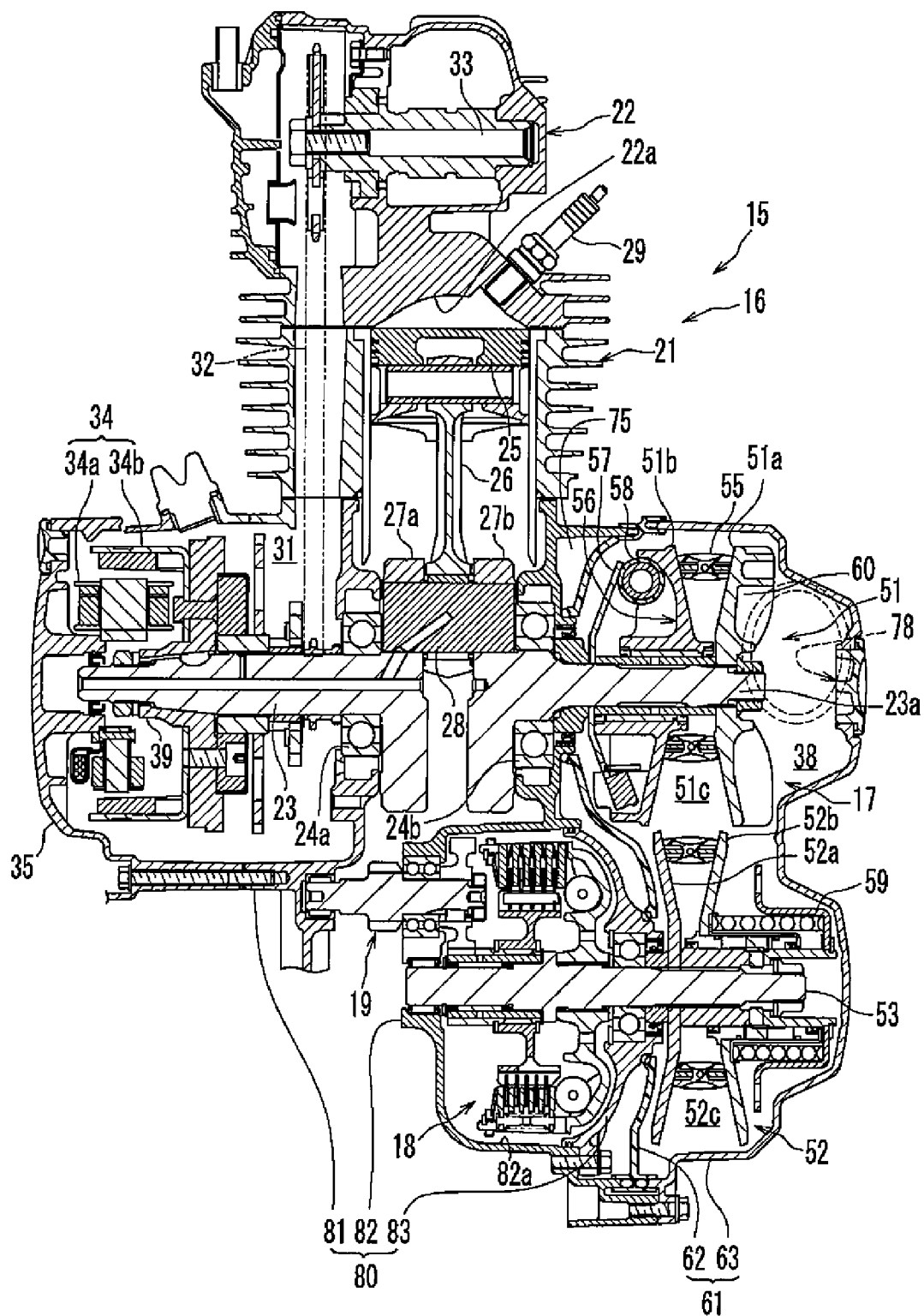
FIG. 3 is a cross-sectional view of an engine unit of the motorcycle of FIG. 1.
Figure 4:
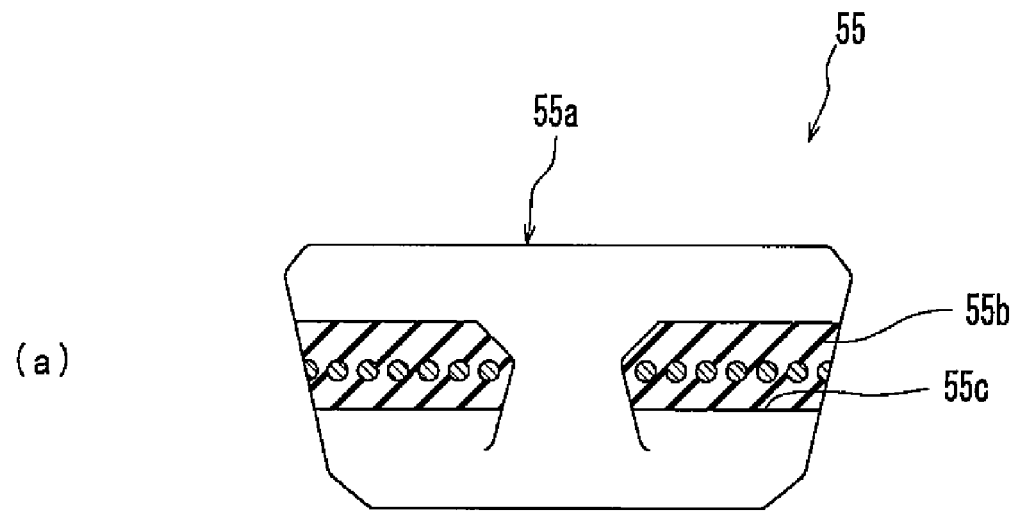
FIG. 4(a) is a cross-sectional view and FIG. 4(b) is a side view of a resin block belt of the motorcycle of FIG. 1.
Figure 4:
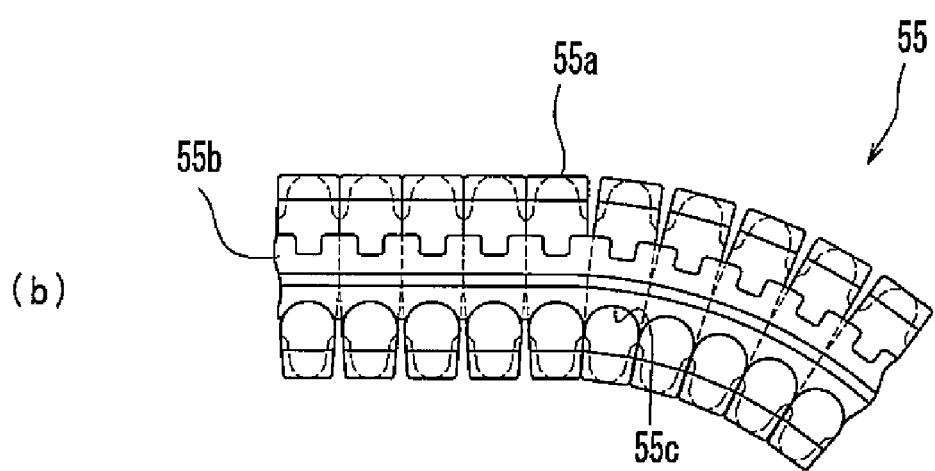

As illustrated in FIGS. 1 and 2, an engine unit 15 is disposed between and attached to down tube 5 and main pipe 6. As illustrated in FIG. 3, engine unit 15 is formed by combining an engine 16, a belt-type continuously variable transmission 17 and other components into one piece. Driving force generated by engine unit 15 is transmitted to rear wheel 13 via power transmitting means such as a chain belt. In the following description, belt-type continuously variable transmission 17 is abbreviated as CVT 17.

<<Structure of Engine Unit 15>>

FIG. 3 shows the cross section of engine unit 15. As illustrated in FIG. 3, engine unit 15 has engine 16, CVT 17, a centrifugal clutch 18, and a speed reduction mechanism 19. While engine 16 is a four-stroke single-cylinder engine in this example, engine 16 may be a two-stroke engine or multi-stroke engine, for example.

Engine 16 has a crank case 80, a cylinder 21 and a cylinder head 22. Cylinder 21 is attached to crank case 80. Cylinder head 22 is attached to the distal end of cylinder 21.

A piston 25 is inserted into cylinder 21 such that piston 25 can slide therein. One end of a connecting rod 26 is connected with piston 25. The other end of connecting rod 26 is connected with a crank pin 28. Crank pin 28 is inserted into through holes formed on a left crank arm 27a and a right crank arm 27b, and fixed to the through holes.

Cylinder head 22 has a concave 22a communicating with the inside space of cylinder 21, and intake and exhaust ports communicating with concave 22a. Concave 22a constitutes a part of a combustion chamber. An ignition plug 29 is attached to cylinder head 22 such that an ignition area of ignition plug 29 is exposed to the outside.

As illustrated in FIGS. 1 and 2, an intake pipe 40 is connected with the intake port and extends toward the rear from cylinder head 22. An air chamber 43 is connected with the rear end of intake pipe 40. Air chamber 43 has an intake hole 43a through which outside air is taken into air chamber 43. Outside air taken into air chamber 43 is supplied to the combustion chamber via intake pipe 40 and the intake port.

As illustrated in FIGS. 1 and 2, an exhaust pipe 41 is connected with the exhaust port at a front region of cylinder head 22. Exhaust pipe 41 extends toward the front from cylinder head 22, crosses over down tube 5, extends downward before engine unit 15, and then extends below engine unit 15 toward the rear. A muffler 42 is connected with the rear end of exhaust pipe 41.

As illustrated in FIG. 3, a cam chain chamber 31 connecting the interior of crank case 80 and the interior of cylinder head 22 is provided in the left part inside cylinder 21. A timing chain 32 accommodated in cam chain chamber 31 is wound around a crank shaft 23 and a cam shaft 33 such that cam shaft 33 rotates in accordance with rotation of crank shaft 23. Rotation of cam shaft 33 opens and closes the intake and exhaust valves.

Crank case 80 has a first case block 81 disposed on the left side, a second case block 82 disposed on the right side, and a clutch cover 83. First and second case blocks 81 and 82 face each other in the vehicle width direction. A concave 82a extending to the left is formed in the rear half of second case block 82. Clutch cover 83 closes concave 82a to define a space that constitutes a clutch chamber containing centrifugal clutch 18.

Crank shaft 23 is accommodated in crank case 80 and horizontally extends in the vehicle width direction. Crank shaft 23 is supported by first case block 81 via a bearing 24a and by second case block 82 via a bearing 24b.

A dynamo case 35 is attached to the left side of the front half of first case block 81. A dynamo chamber defined by dynamo case 35 and first case block 81 accommodates a dynamo 34. Dynamo 34 is attached to crank shaft 23 within the dynamo chamber and has a stator 34a and a rotor 34b. Rotor 34b is fixed to a sleeve 39 rotating with crank shaft 23. Stator 34a is fixed to dynamo case 35. Rotor 34b thereby rotates relative to stator 34a in accordance with the rotation of crank shaft 23 for power generation.

A transmission case 61 containing CVT 17 is attached to the right side of second case block 82. Transmission case 61 defines the section of a belt chamber 38 accommodating CVT 17. Transmission case 61 has an inside case 62 made of resin and disposed on the right side of second case block 82, and an outside case 63 positioned on the right side of inside case 62.

CVT 17 has a primary sheave 51 and a secondary sheave 52. Primary sheave 51 is attached to the right end of crank shaft 23, which penetrates through second case block 82 and inside case 62, and reaches belt chamber 38. In the following description, the right portion of crank shaft 23 is also referred to as primary sheave shaft 23a. More accurately, primary sheave shaft 23a is constituted by the portion of crank shaft 23 positioned on the right side of bearing 24b.

Primary sheave 51 has a primary fixed sheave member 51a and a primary movable sheave member 51b. Primary fixed sheave member 51a is fixed to the right end of primary sheave shaft 23a. Primary movable sheave member 51b positioned on the left side of primary fixed sheave member 51a is attached to primary sheave shaft 23a. Primary movable sheave member 51b can shift relative to primary sheave shaft 23a in its axial direction.

The left side surface of primary fixed sheave member 51a has a tapered shape expanding to the right. The right side surface of primary movable sheave member 51b has a tapered shape expanding to the left. The left side surface of primary fixed sheave member 51a and right side surface of primary movable sheave member 51b form a substantially V-shaped belt groove 51c which has a width increasing toward the outside in the radial direction. A plurality of fan vanes 60 are provided on the right side surface of primary fixed sheave member 51a.

A cam surface 56 is disposed on the left side surface of primary movable sheave member 51b. A cam plate 57 is located on the left side of primary movable sheave member 51b in opposition to cam surface 56. Cam plate 57 is fixed to primary sheave shaft 23a and engages with primary movable sheave member 51b to prevent rotation of primary movable sheave member 51b relative to primary sheave shaft 23a. Roller weights 58 movable in the radially inside-outside direction are disposed between cam surface 56 and cam plate 57.

Secondary sheave 52 is positioned behind primary sheave 51 and is attached to a secondary sheave shaft 53. Secondary sheave 52 has a secondary fixed sheave member 52a and a secondary movable sheave member 52b. Secondary fixed sheave member 52a is fixed to secondary sheave shaft 53. Secondary movable sheave member 52b positioned on the right side of secondary fixed sheave member 52a is attached to secondary sheave shaft 53. Secondary movable sheave member 52b can shift in the axial direction of secondary sheave shaft 53.

The right side surface of secondary fixed sheave member 52a has a tapered shape expanding to the left. The left side surface of secondary movable sheave member 52b has a tapered shape expanding to the right. The right side surface of secondary fixed sheave member 52a and left side surface of secondary movable sheave member 52b form a substantially V-shaped belt groove 52c having a width increasing toward the outside in the radial direction.

A compression coil spring 59 provided on the right side of secondary movable sheave member 52b urges secondary movable sheave member 52b to the left. Thus, secondary movable sheave member 52b is urged toward secondary fixed sheave member 52a by compressing coil spring 59.

A resin block belt 55 having a substantially V-shaped cross section is wound around belt groove 51c of primary sheave 51 and belt groove 52c of secondary sheave 52. Resin block belt 55 has a plurality of resin blocks 55a as illustrated in FIG. 4(a). Resin blocks 55a are arranged in a ring-band shape and are connected with one another by a pair of flexible connecting members 55b. Each resin block 55a has a pair of concaves 55c opposed to each other. Resin blocks 56a are connected with one another by fitting connecting members 65b into concaves 55c.

As illustrated in FIG. 3, secondary sheave shaft 53 penetrates through inside case 62 and clutch cover 83 and reaches a clutch chamber. Centrifugal clutch 18 is attached to secondary sheave shaft 53 in the clutch chamber. Centrifugal clutch 18 may be a wet-type multi-disc clutch, for example.

Centrifugal clutch 18 engages with speed reduction mechanism 19. Rotation of secondary sheave shaft 53 is transmitted to speed reduction mechanism 19 via centrifugal clutch 18. Then, the torque thus generated is transmitted from an output shaft of speed reduction mechanism 19 to rear wheel 13 via the power transmitting means.

<<Air Intake and Exhaust to and from Belt Chamber 38>>

Figure 5:
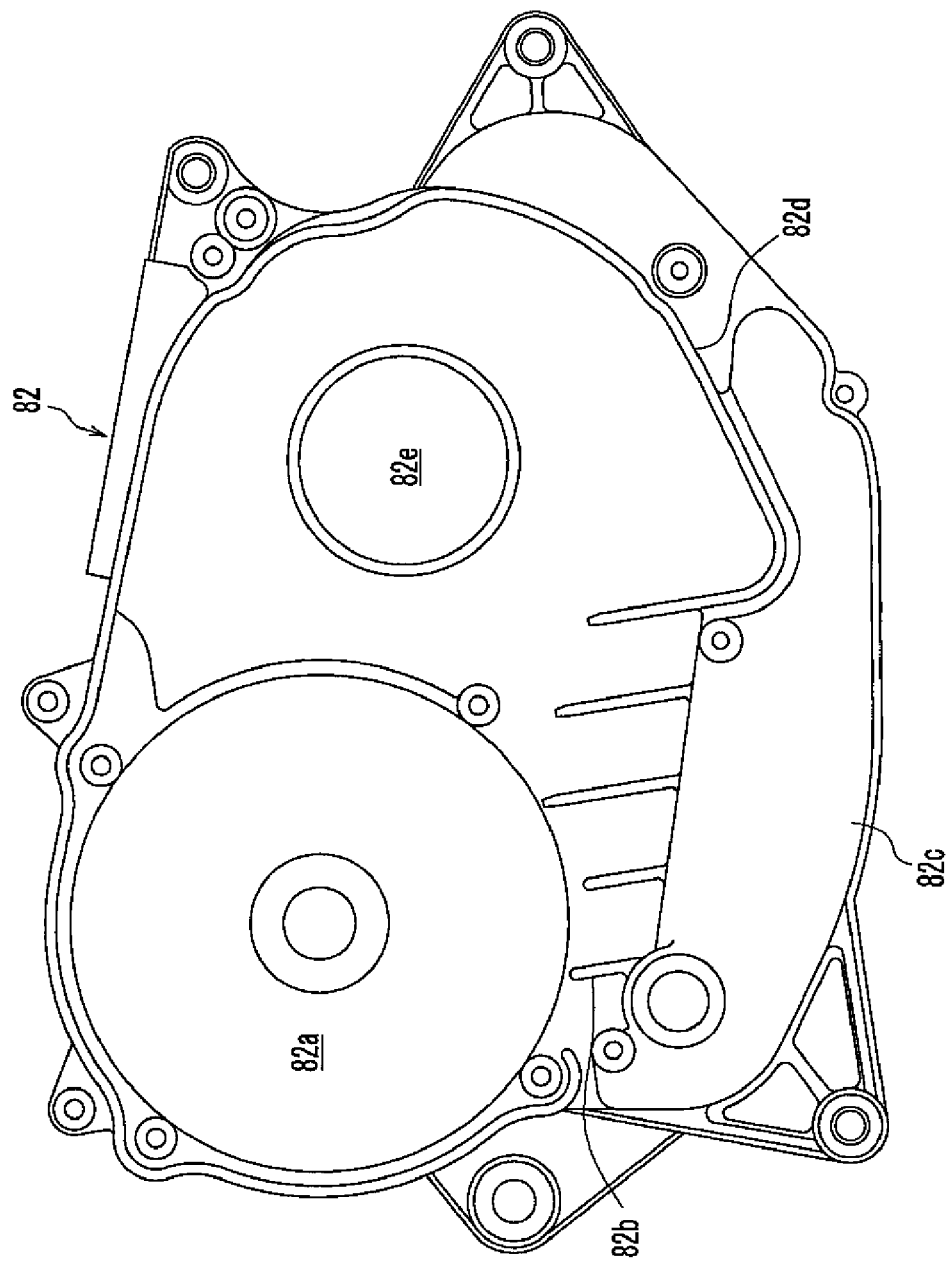
FIG. 5 is a right side view of a second case block of the motorcycle of FIG. 1.
Figure 6:
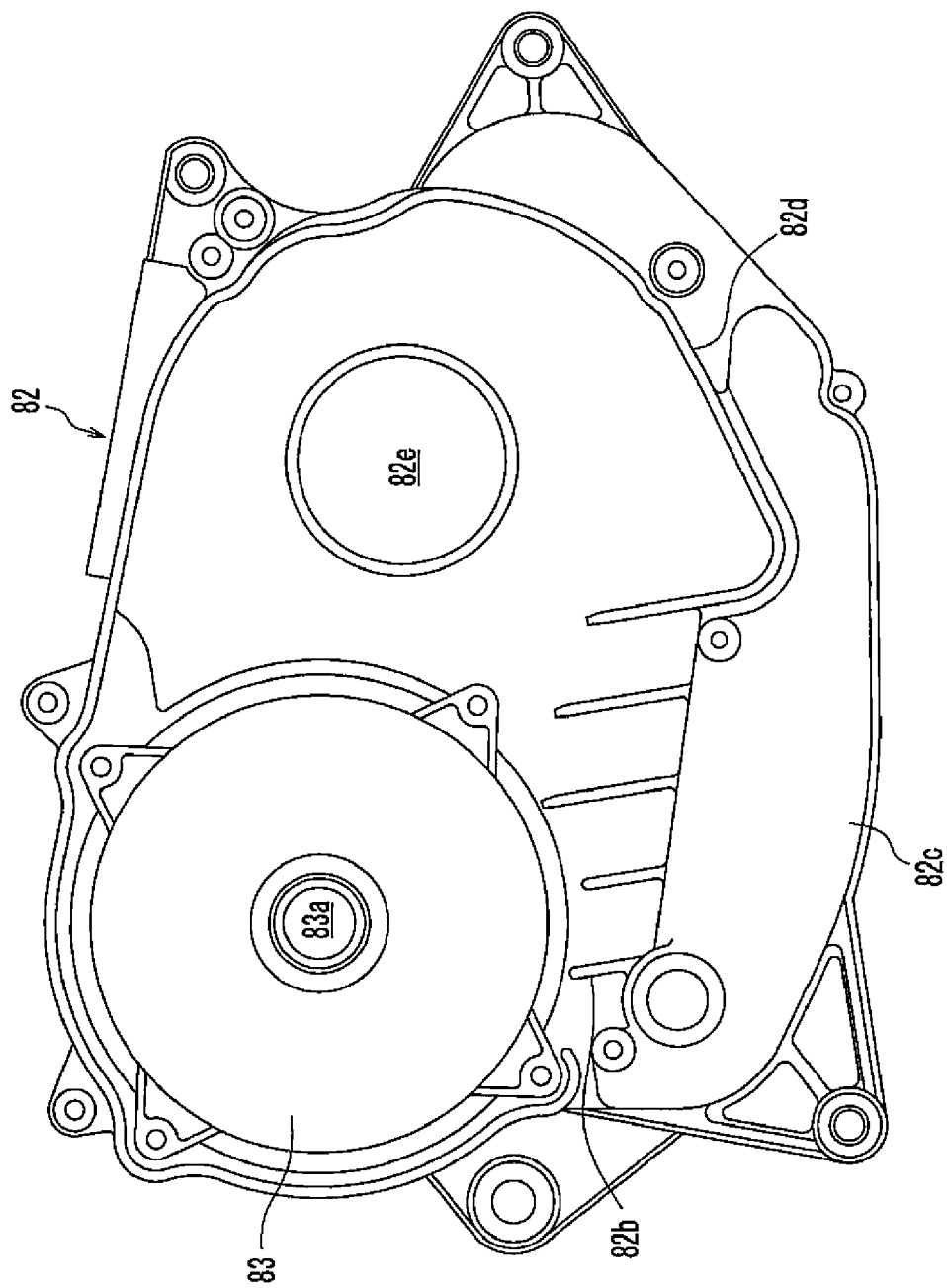
FIG. 6 is a right side view of the second case block of FIG. 5 to which a clutch cover is attached.
Figure 7:
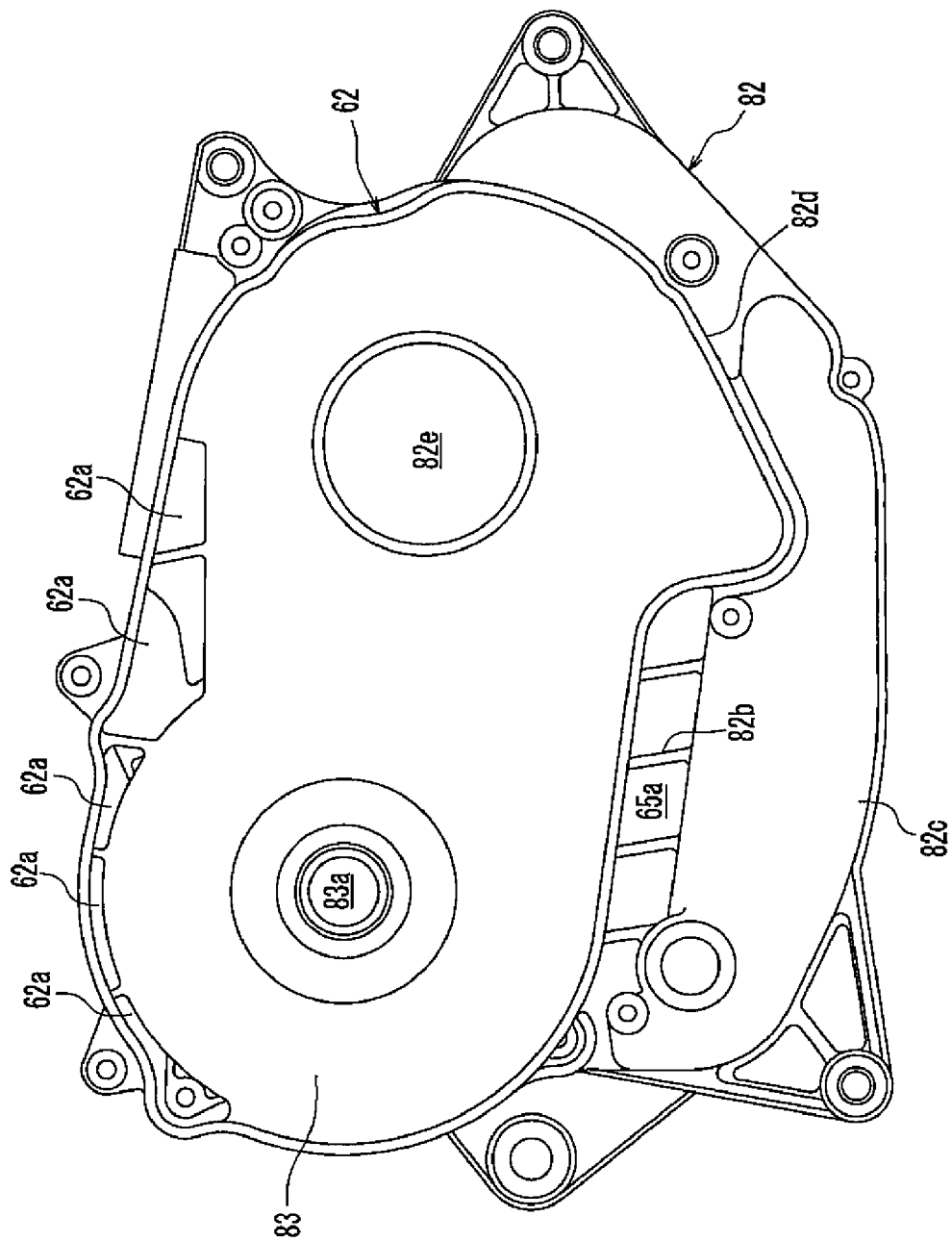
FIG. 7 is a right side view of the second case block of FIG. 5 to which the clutch cover and an inside case are attached.
Figure 8:
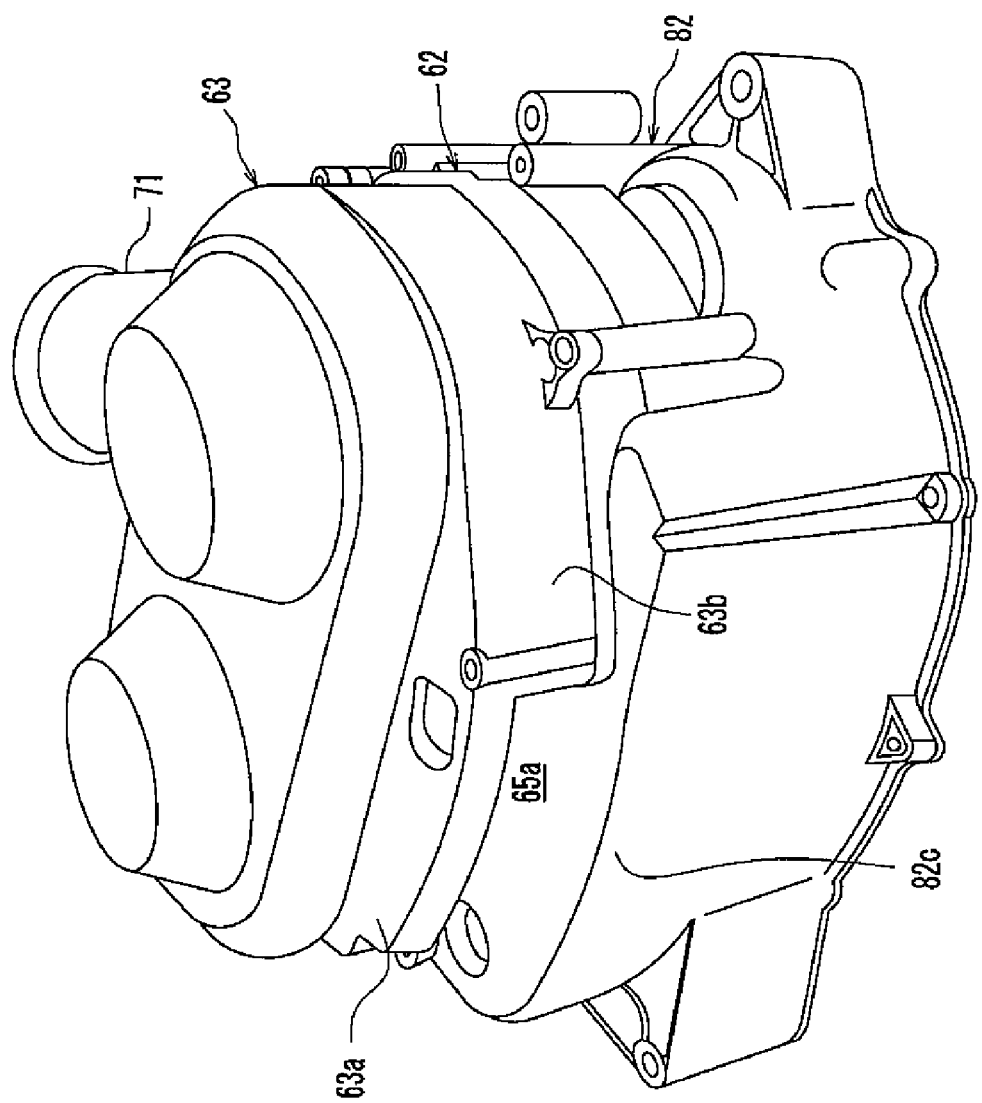
FIG. 8 is a perspective view of the second case block of FIG. 5 to which the clutch cover, the inside case, and an outside case are attached, as viewed from below inclined to the front.
Figure 9:
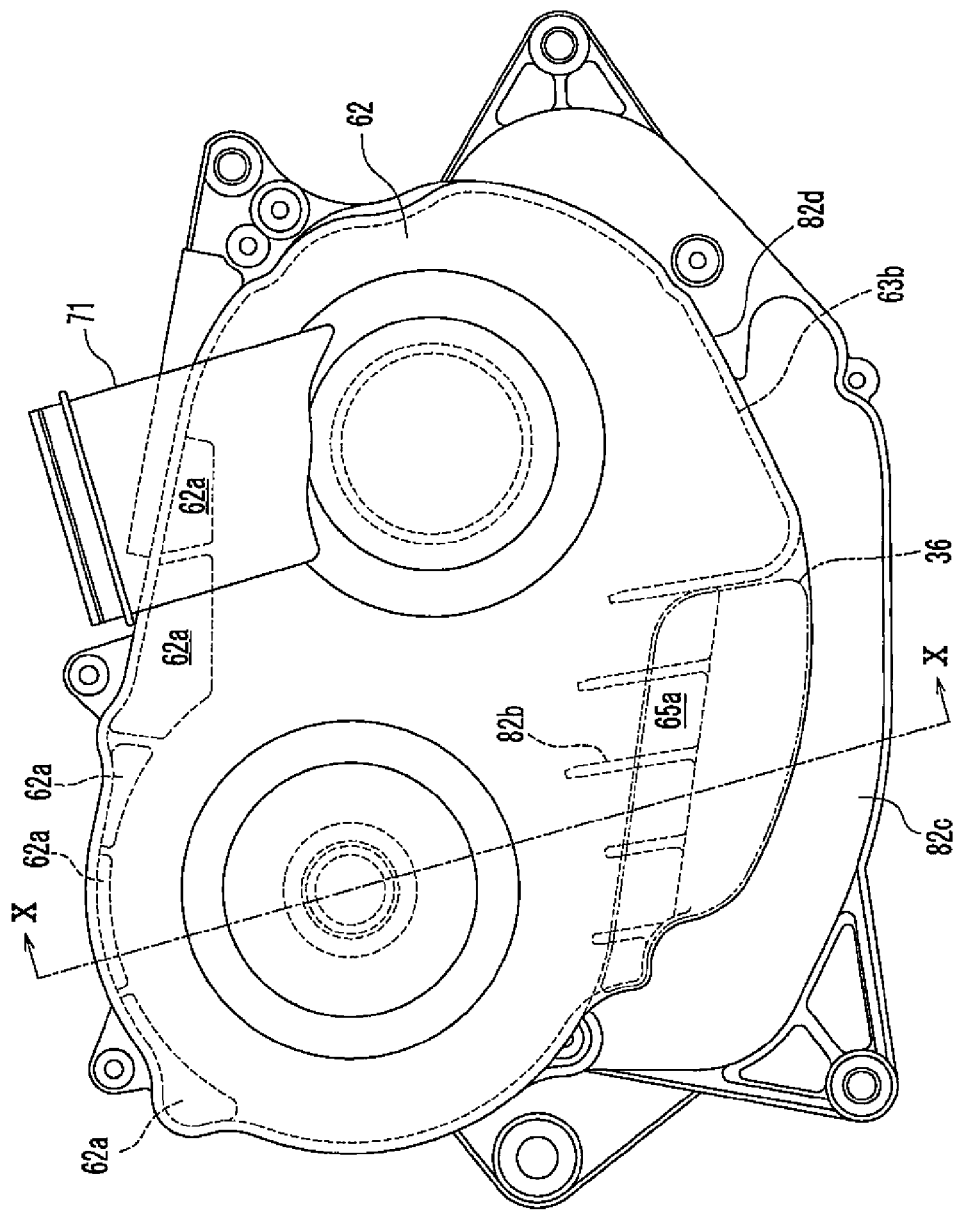
FIG. 9 is a right side view of the second case block of FIG. 5 to which the clutch cover, the inside case, and the outside case are attached.
Figure 10:
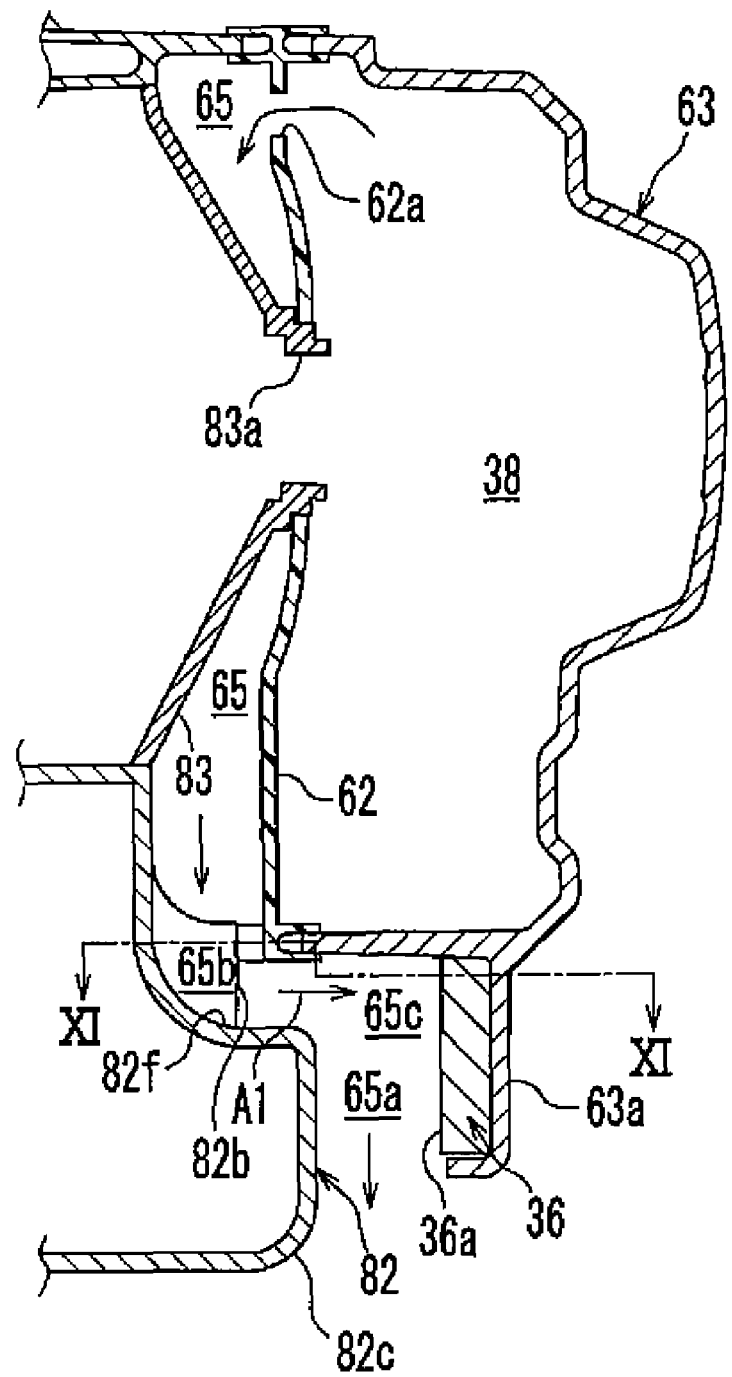
FIG. 10 is a cross-sectional view taken along line X-X of FIG. 9.
Figure 11:
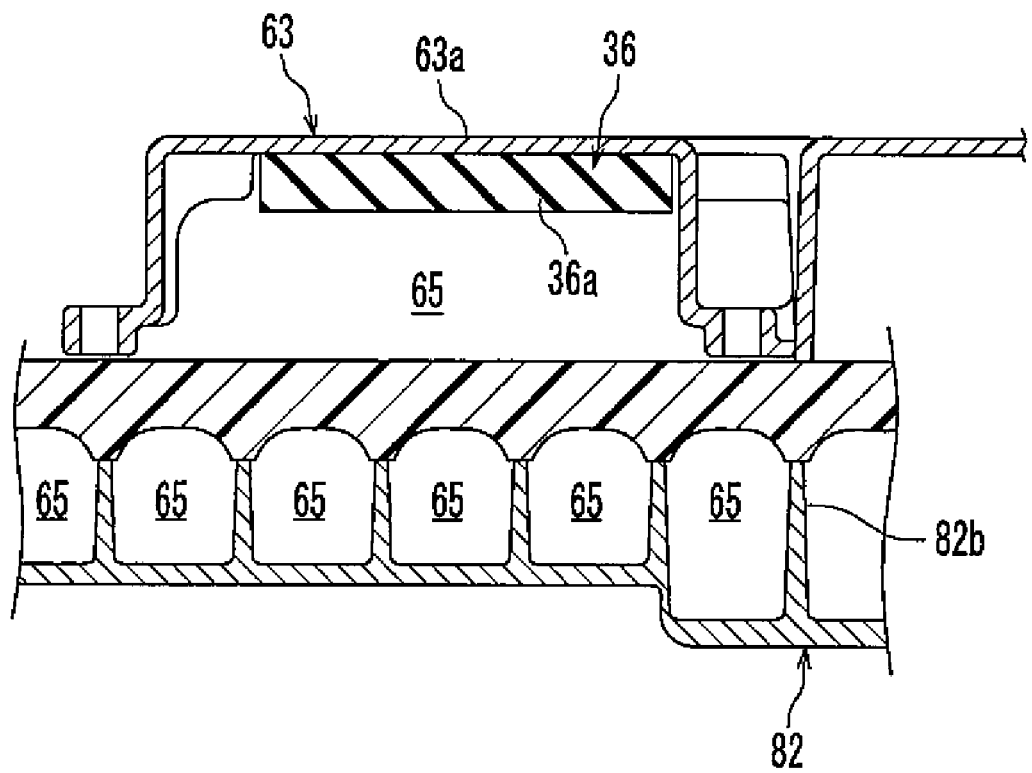
FIG. 11 is a cross-sectional view taken along line XI-XI of FIG. 10.

Air intake and exhaust to and from belt chamber 38 are now explained in detail with reference to FIG. 5 and other figures. FIG. 5 is a right side view of second case block 82. FIG. 6 is a right side view of second case block 82 to which clutch cover 83 is attached. FIG. 7 is a right side view of second case block 82 to which clutch cover 83 and inside case 62 are attached. FIG. 8 is a perspective view of second case block 82 to which clutch cover 83, and inside and outside cases 62 and 63 are attached as viewed from below inclined to the front. FIG. 9 is a right side view of second case block 82 to which clutch cover 83 and inside and outside cases 62 and 63 are attached. FIG. 10 is a cross-sectional view taken along line X-X of FIG. 9. FIG. 11 is a cross-sectional view taken along line XI-XI of FIG. 10. FIG. 10 shows only second case block 82, clutch cover 83, and transmission case 61 for simplifying the explanation.

—Detailed Structures of Second Case Block 82, Transmission Case 61 and Others—

As illustrated in FIG. 5, an opening 82e through which primary sheave shaft 23a is inserted is formed in the front half of second case block 82. A concave 82a containing the clutch chamber is formed in the rear half of second case block 82. As illustrated in FIGS. 3 and 6, concave 82a is closed by clutch cover 83. An opening 83a through which secondary sheave shaft 53 is inserted is formed at the center of clutch cover 83.

A plurality of linear convexes (ribs) 82b are formed below concave 82a. Convexes 82b are arranged in a line substantially in the horizontal direction and slightly diagonally upward toward the rear. Convexes 82b extend in the up-down direction, and project to the right from the right side surface of second case block 82. That is, linear convexes 82b project toward the inside of case 62 from the right side surface of second case block 82. As illustrated in FIG. 11, convexes 82b contact inside case 62. This structure allows inside case 62, which has relatively low strength, to be appropriately supported.

As can be seen from the cross section shown in FIG. 11, a concaved portion having an arch shape is formed between each of the contact portions of inside case 62 contacting linear convexes 82b.

An expanding portion 82c is formed immediately below convexes 82b of second case block 82. Expanding portion 82c extends to a position on the right side of the right end of linear convexes 82b, that is, to the outside of the right end of linear convexes 82b. Expanding portion 82c extends in a wider range than the area where convexes 82b are formed in the front-rear direction.

As illustrated in FIGS. 3 and 7, inside case 62 is disposed on the right side of second case block 82. Inside case 62 covers substantially the entire part of the right region of second case block 82 except for openings 82e and 83a, expanding portion 82c, and the lower region where linear convexes 82b are formed. As illustrated in FIG. 10, a space is produced between inside case 62 and second case block 82. A plurality of communication openings 62a through which this space communicates with belt chamber 38 are formed in the upper region of inside case 62 (see FIG. 3 as well). This structure allows belt chamber 38 to communicate with outside air via communication openings 62a and the space between inside case 62 and second case block 82. According to this embodiment, the space between inside case 62 and second case block 82 constitutes an exhaust passage 65. As illustrated in FIG. 10, exhaust passage 65 is bended to the right by expanding portion 82c to form a labyrinth structure. That is, exhaust passage 65 has a plurality of bended portions 65b. While exhaust passage 65 has plural bended portions 65b in this embodiment, exhaust passage 65 may have one or plural curved portions. Alternatively, exhaust passage 65 may have one or plural curved portions as well as one or plural bended portions.

As illustrated in FIG. 10, outside case 63 is positioned on the right side of inside case 62. Belt chamber 38 is defined by outside case 63 and inside case 62.

An extension 63a extending downward to a position lower than the lower end of inside case 62 is provided on the lower rear portion of outside case 63. Extension 63a and second case block 82 are positioned away from each other. Extension 63a extends to a position opposed to expanding portion 82c in the up-down direction. In other words, extension 63a has a portion opposed to linear convexes 82b in the vehicle width direction and a portion opposed to expanding portion 82c provided below linear convexes 82b.

Exhaust passage 65 is bended downward by extension 63a at a position downstream from bended portion 65b. Thus, exhaust passage 65 has a bended portion 65c positioned downstream from bended portion 65b. Bended portion 65c may be a curved portion.

A sound absorbing member 36 is attached to the inside (left) surface of extension 63a. That is, sound absorbing member 36 is attached to the left side surface of extension 63a. Sound absorbing member 36 has a sound absorbing surface 36a crossing the projecting direction of linear convexes 82b (FIG. 11). More specifically, sound absorbing member 36 as a face material is disposed in such a position as to cross the projection direction of linear convexes 82b. The angle formed by sound absorbing face 36a and the projecting direction of linear convexes 82b may be a right angle. Alternatively, the angle formed by sound absorbing surface 36a and the projecting direction of linear convexes 82b may be an acute angle or an obtuse angle.

For obtaining high sound absorbing efficiency, sound absorbing member 36 preferably has a number of spaces inside its body. For example, sound absorbing member 36 may be made of foamed material, glass wool, or steel wool. Examples of foamed material include foamed resin such as foamed urethane, foamed rubber, and other materials.

As illustrated in FIGS. 8 and 9, an expanding portion 63b is formed before extension 63a of outside case 63. Expanding portion 63b is expanded to a position lower than the upper end of expanding portion 82c in the up-down direction. Expanding portion 63b covers the space between extension 63a and second case block 82 in the front view.

As illustrated in FIG. 3, an intake opening 78 is formed on the upper surface of outside case 63. An intake duct 71 is connected with intake opening 78 (see FIGS. 1, 2 and 8 as well). As illustrated in FIGS. 1 and 2, intake duct 71 extends upward from transmission case 61, and then extends in the horizontal direction toward the rear from the intermediate portion of intake duct 71. An air chamber 94 is connected with the rear side end of intake duct 71. Air chamber 94 purifies outside air introduced thereto. More specifically, air chamber 94 removes dust contained in the outside air thus taken.

Figure 12:
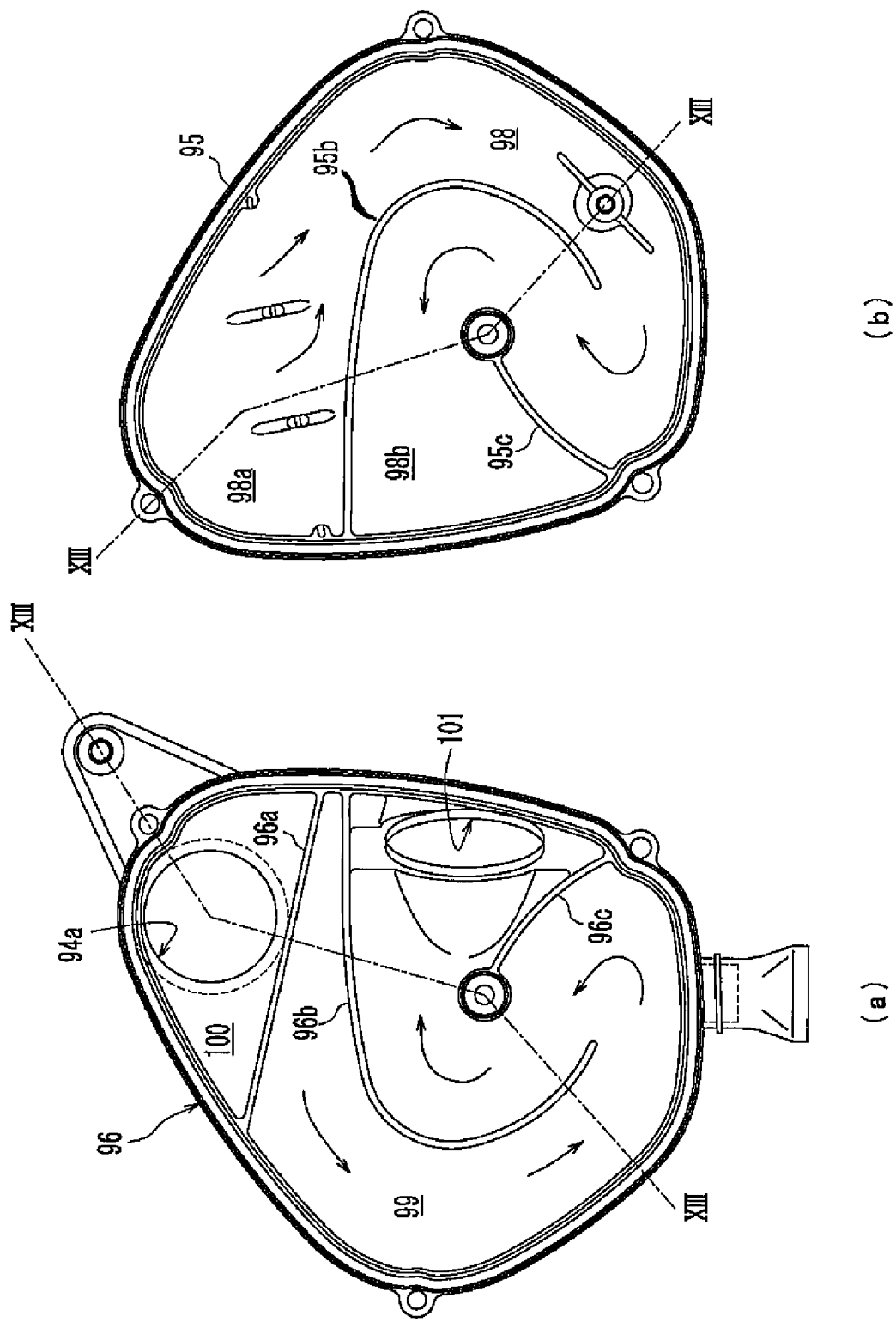
FIGS. 12(a) and 12(b) are development elevations showing two divided portions of an air chamber of the motorcycle of FIG. 1.
Figure 13:
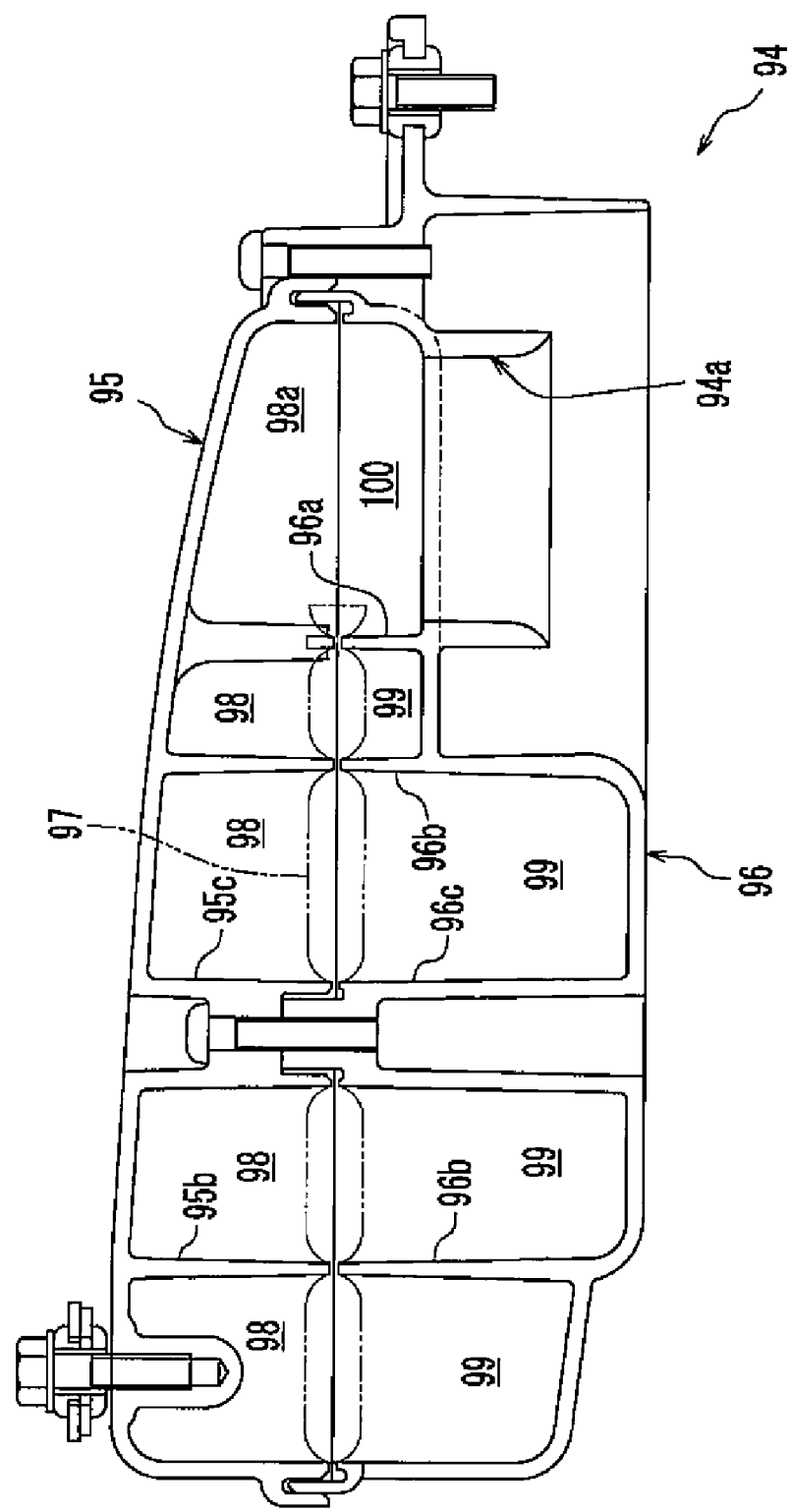
FIG. 13 is a cross-sectional view taken along line XIII-XIII of FIG. 12.

FIGS. 12(*a*) and 12(*b*) are development elevations showing two divided parts of air chamber 94. FIG. 13 is a cross-sectional view of air chamber 94. Air chamber 94 has a first casing 95 (FIG. 12(*b*)) and a second casing 96 (FIG. 12(*a*)) combined in such a manner as to be opposed to each other.

As illustrated in FIG. 12(*b*), walls 95b and 95c are provided inside first casing 95. Walls 95b and 95c define a first intake passage 98 extending in a zigzag line.

As illustrated in FIG. 12(*a*), walls 96a, 96b and 96c are provided inside second casing 96. Wall 96a divides the interior of second casing 96 into two areas. Second casing 96 has an intake opening 94a that opens to an upper inside area 100 within second casing 96. Inside area 100 communicates with a base end 98a of first intake passage 98 of first casing 95 (see FIG. 12(*b*)).

Walls 96b and 96c are provided in the lower inside area of second casing 96. Walls 96b and 96c define a second intake passage 99 extending in a zigzag line within the lower inside area of second casing 96. As illustrated in FIG. 13, second intake passage 99 and first intake passage 98 face each other with an air cleaner 97 interposed therebetween.

Wall 96b has a shape corresponding to that of wall 95b. Wall 96c has a shape corresponding to the shape of wall 95c. Thus, first intake passage 98 and second intake passage 99 are mirror images of each other.

—Intake and Exhaust Operations to and from Belt Chamber 38—

As discussed above, plural vanes 60 are provided on the left side surface of primary fixed sheave member 51a disposed within belt chamber 38 (see FIG. 3). Vanes 60 rotate with rotation of primary sheave shaft 23a. That is, vanes 60 rotate with rotation of crank shaft 23. As a result, an absorbing force toward belt chamber 38 is generated, and outside air taken from air chamber 94 is taken into belt chamber 38 by rotation of vanes 60.

More specifically, outside air is initially taken from intake opening 94a into air chamber 94. Outside air taken from intake opening 94a is introduced to base end 98a of first intake passage 98 via inside area 100 (see FIG. 12 and FIG. 13). Air introduced to base end 98a flows from base end 98a to a distal end 98b, and a part of this air passes through air cleaner 97 and flows into second intake passage 99. Air having flowed into second intake passage 99 is supplied to intake duct 71 via an opening 101 formed at the distal end of second intake passage 99 (see FIGS. 1 and 2).

Air supplied to intake duct 71 is supplied to the front half of belt chamber 38 (see chiefly FIGS. 3 and 10). That is, air supplied to intake duct 71 is supplied to the area where primary sheave 51 is disposed. CVT 17 is cooled by outside air thus taken. Air supplied to belt chamber 38 flows within belt chamber 38, passes through exhaust passage 65 formed between inside case 62 and second case block 82, and then is discharged through communication openings 62a.

The discharge air initially advances downward in exhaust passage 65 (see FIG. 10). Then, the flow direction of the discharge air is changed by bended portion 65b. That is, air flowing downward is changed to air flowing to the right by collision with a wall 82f. Then, the discharge air collides with sound absorbing surface 36a of sound absorbing member 36 at bended portion 65c, where the flow direction is further changed to the downward direction. Thereafter, the air is discharged through an exhaust opening 65a.

As discussed above, sound absorbing member 36 is attached to the inner wall of discharge passage 65 in such a position as to collide with air passing through discharge passage 65. More specifically, sound absorbing member 36 is attached to the inside wall of extension 63a constituting bended portion 65c.

Sound absorbing member 36 has sound absorbing surface 36a. Sound absorbing surface 36a crosses an extending direction A1 of a portion of exhaust passage 65 upstream from sound absorbing member 36 (i.e., a portion of exhaust passage 65 closer to belt chamber 38 relative to sound absorbing member 36). In other words, sound absorbing surface 36a is not disposed in parallel with extending direction A1 of the portion of exhaust passage 65 upstream from sound absorbing member 36. More specifically, sound absorbing surface 36a may be disposed orthogonal to extending direction A1. Alternatively, the angle formed by sound absorbing surface 36a and extending direction A1 may be an acute or an obtuse angle. According to this embodiment, the area of exhaust passage 65 upstream from sound absorbing member 36 is specifically the area between bended portions 65b and 65c.

Linear convexes 82b extend along the extending direction of exhaust passage 65.

<<Operation and Advantage>>

As discussed above, sound absorbing member 36 has sound absorbing surface 36a inclined at an angle to the projecting direction of linear convexes 82b. In other words, as illustrated in FIG. 10, sound absorbing member 36 has sound absorbing surface 36a which crosses extending direction A1 of the portion of exhaust passage 65 upstream from sound absorbing member 36 and closer to belt chamber 38, i.e. the area between bended portions 65b and 65c. Sound member 36 is located in such a position as to collide with sound waves traveling from the inside of belt chamber 38 toward the outside. Concerning the relationship between the flow of exhaust air and sound absorbing member 36, sound absorbing member 36 is disposed in such a position as to collide with air flowing through exhaust passage 65.

Thus, sound absorbing member 36 effectively absorbs high-frequency sound having high rectilinear propagation generated by resin block belt 55. As a result, escape of high-frequency sound generated by resin block belt 55 from exhaust passage 65 is effectively prevented. Moreover, high-frequency sound having low penetrability through an object does not easily penetrate through outside case 63 or other components to escape therefrom. Thus, escape of noise generated by resin block belt 55 to the outside is effectively prevented.

These advantages are obtained as long as sound absorbing member 36 is disposed in such a position as to collide with the sound wave traveling from the inside of belt chamber 38 toward the outside. Thus, sound absorbing surface 36a is not necessarily disposed orthogonal to the traveling direction of sound waves traveling from the inside of belt chamber 38 toward the outside. More specifically, sound absorbing surface 36a is not necessarily disposed orthogonal to the extending direction of the portion of exhaust passage 65 upstream from sound absorbing member 36 (closer to belt chamber 38). For example, even when the angle formed by sound absorbing surface 36a and the traveling direction of sound traveling from the inside of belt chamber 38 toward the outside is an acute or an obtuse angle, the above advantages are still gained. In other words, even when the angle formed by sound absorbing surface 36a and extending direction A1 of the portion of exhaust passage 65 upstream from sound absorbing member 36 is an acute or an obtuse angle, the above advantages are still gained.

For reducing the escape of noise generated by resin block belt 55 to the outside more effectively, the sound absorbing member is preferably provided on the inside or outside of outside case 63. In this case, penetration of high-frequency sound through outside case 63 is more securely prevented. However, as discussed above, high-frequency sound has low penetrability through an object. Thus, the escape of sound generated by resin block belt 55 to the outside can be effectively prevented even when the sound absorbing member is not disposed on the inside or outside of outside case 63. Thus, the escape of sound generated by resin block belt 55 to the outside can be effectively prevented without a sound absorbing member on the inside or outside of outside case 63 and therefore without increasing the size of CVT 17 and engine unit 15.

Moreover, since the necessity for a sound absorbing member having thermal insulation on the inside or outside of outside case 63 is eliminated, relatively high heat release efficiency through outside case 63 is achieved. As a result, the cooling efficiency of CVT 17 is improved.

Sound absorbing member 36 is preferably disposed on the exhaust side as in this embodiment, since high-frequency sound does not easily escape from the intake side where air filter 79, which has sound absorbing capability as well, is generally disposed. In addition, this structure is preferable since noise in belt chamber 38 escaping to the outside from the exhaust passage is relatively greater than noise in belt chamber 38 escaping from the intake passage.

Sound absorbing member 36 may be disposed at a position other than extension 63a. Sound absorbing member 36 is preferably provided on an inner wall of exhaust passage 65 at an outside corner of a portion where flow of air to be discharged changes, such as bended portions 65b and 65c. For example, sound absorbing member 36 may be located on wall 82f of second case block 82. Sound absorbing member 36 may be provided on both wall 82f and extension 63a to obtain a higher noise proof effect.

According to this embodiment, in addition to sound absorbing member 36, exhaust passage 65 has a labyrinth structure. More specifically, exhaust passage 65 has plural bended portions 65b and 65c. Thus, high-frequency sound having entered exhaust passage 65 collides with walls at plural bended portions 65b and 65c, and thereby decreases. More specifically, high-frequency sound having entered exhaust passage 65 collides with wall 82f of second case block 82 and decreases. Thus, escape of sound generated by resin block belt 55 to the outside is further reduced. This noise reduction effect can be obtained by collision between high-frequency sound in exhaust passage 65 and walls of components of CVT 17. Thus, the noise reduction effect can be similarly obtained even when curved portions are provided instead of bended portions 65b and 65c. To further reduce noise, plural bended or curved portions are preferably formed.

Intake passages 98 and 99 covered by the air cleaner having sound absorbing capability also preferably have a labyrinth structure, as in this embodiment, to further prevent escape of high-frequency sound from intake passages 98 and 99.

As illustrated in FIG. 11, inside case 62 made of resin and having relatively low hardness is supported by linear convexes 82b in this embodiment. This structure improves the durability of inside case 62. To enhance the durability of inside case 62, a linear convex extending in the front-rear direction along the contour of inside case 62 may also be formed. In this case, a slit is formed on the linear convex to secure the space of exhaust passage 65. In this structure, however, it is difficult to secure a sufficiently wide space of exhaust passage 65. Enlarging the width of the slit to secure a sufficient space of exhaust passage 65 lowers the durability of the linear convex and consequently the durability of inside case 62. However, where linear convexes 82b extend substantially in parallel with the extending direction of exhaust passage 65, as in this embodiment, the durability of inside case 62 is increased and a relatively large space of exhaust passage 65 is secured.

According to this embodiment, the portions between the portions of inside case 62 contacting linear convexes 82b are concaved in an arched shape. Thus, a further wide space of exhaust passage 65 is secured.

According to this embodiment, linear convexes 82b extend along the flow of exhaust air and offer a rectification effect that reduces the noise of exhaust air. To enhance this rectification effect, the arrangement pitch of linear convexes 82b is preferably decreased. On the other hand, for enlarging the opening area of exhaust passage 65, the pitch of linear convexes 82b is preferably increased. For widening the opening area of exhaust passage 65, only a single linear convex 82b may be formed.

According to this embodiment, communication openings 62a through which exhaust passage 65 and belt chamber 38 communicate with each other are opened in the upper region of belt chamber 38 as illustrated in FIGS. 7, 9 and 10. Thus, water or mud entering exhaust passage 65 through exhaust opening 65a does not easily enter belt chamber 38. In addition, since the lower portion of exhaust opening 65a is covered by lower extending portion 82c, entry of splashed water or mud through exhaust opening 65a into exhaust passage 65 is effectively reduced. Moreover, since exhaust opening 65a is covered by extending portion 63b and front expanding portion 82d in a front view, entry of water or mud splashed by front wheel 12 through exhaust opening 65a into exhaust passage 65 is particularly effectively prevented.

The center of secondary sheave 52 is positioned above the center of primary sheave 51 in a lateral view. Thus, exhaust opening 65a is located at a relatively high position from ground level. Accordingly, entry of splashed water or mud into exhaust passage 65 through exhaust opening 65a is effectively prevented.

Modified Examples 1-4

In the above embodiment, sound absorbing member 36 is attached to extension 63a. However, the attachment position of sound absorbing member 36 is not particularly limited as long as sound absorbing member 36 is positioned to collide with sound waves traveling from belt chamber 38 to the outside.

Figure 14:
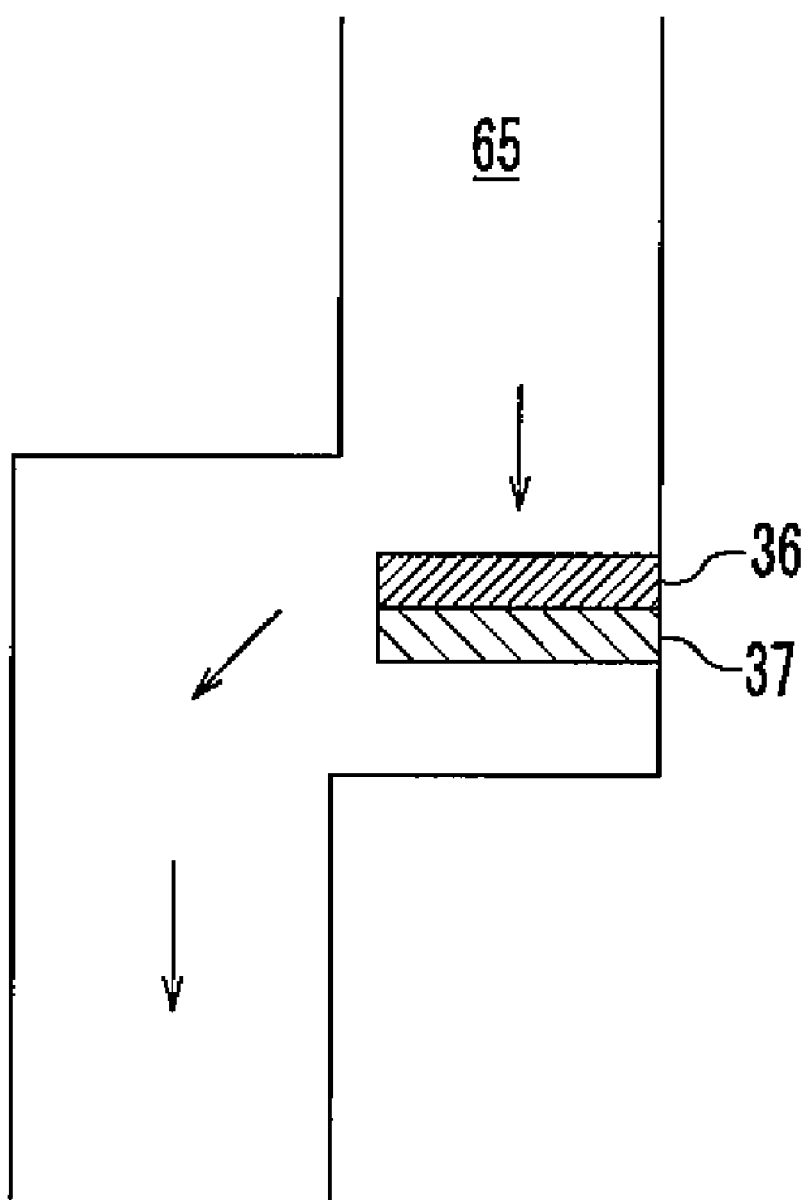
FIG. 14 schematically illustrates a position of a sound absorbing member according to a modified example 1.

For example, as illustrated in FIG. 14, sound absorbing member 36 may be attached to a projecting portion 37 provided inside an exhaust passage 65 having plural bended portions.

Figure 15:
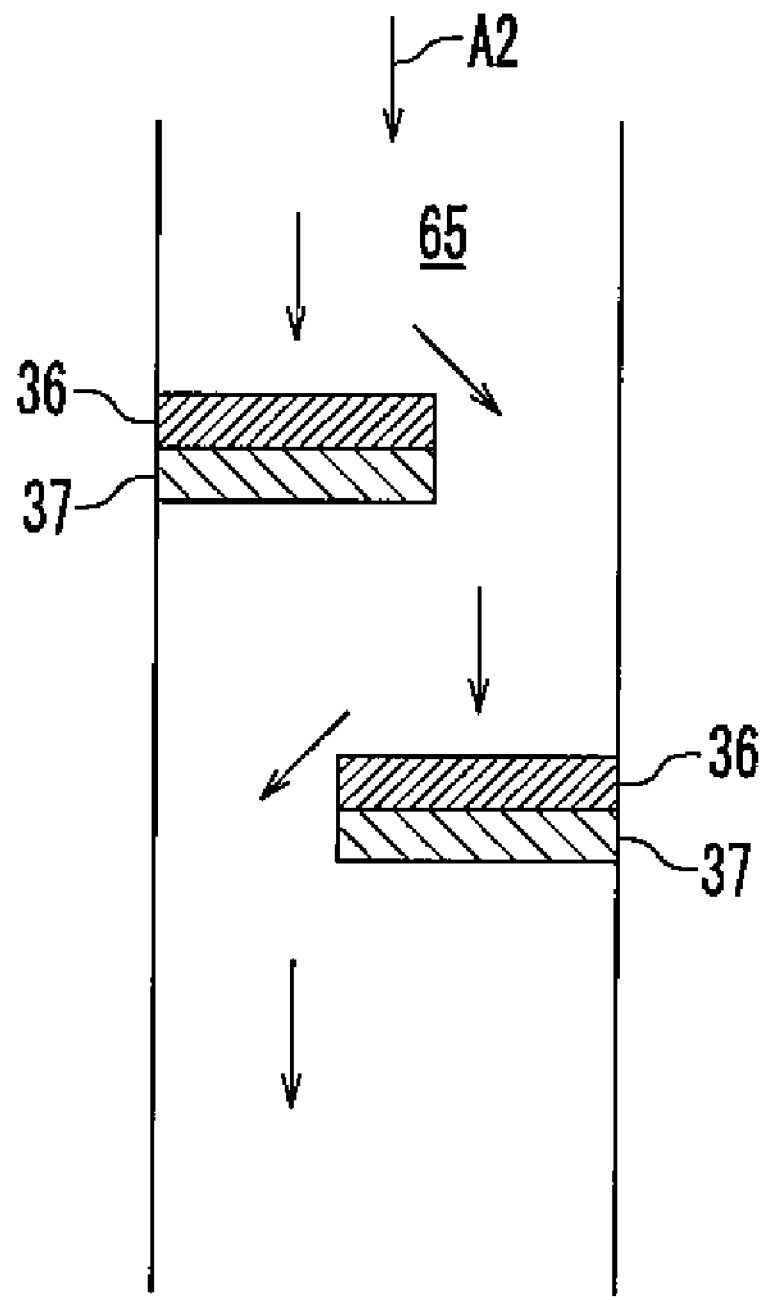
FIG. 15 schematically illustrates positions of sound absorbing members according to a modified example 2.

As illustrated in FIG. 15, sound absorbing members 36 may be provided on plural projecting portions 37 disposed in staggered arrangement within a straight exhaust passage 65. In this case, sound absorbing members 36 are preferably disposed to cover the flow path of exhaust passage 65 as viewed from an extending direction A2 of a portion of exhaust passage 65 upstream from projecting portions 37. According to this modified example, extending direction A2 coincides with the extending direction of exhaust passage 65.

Figure 16:
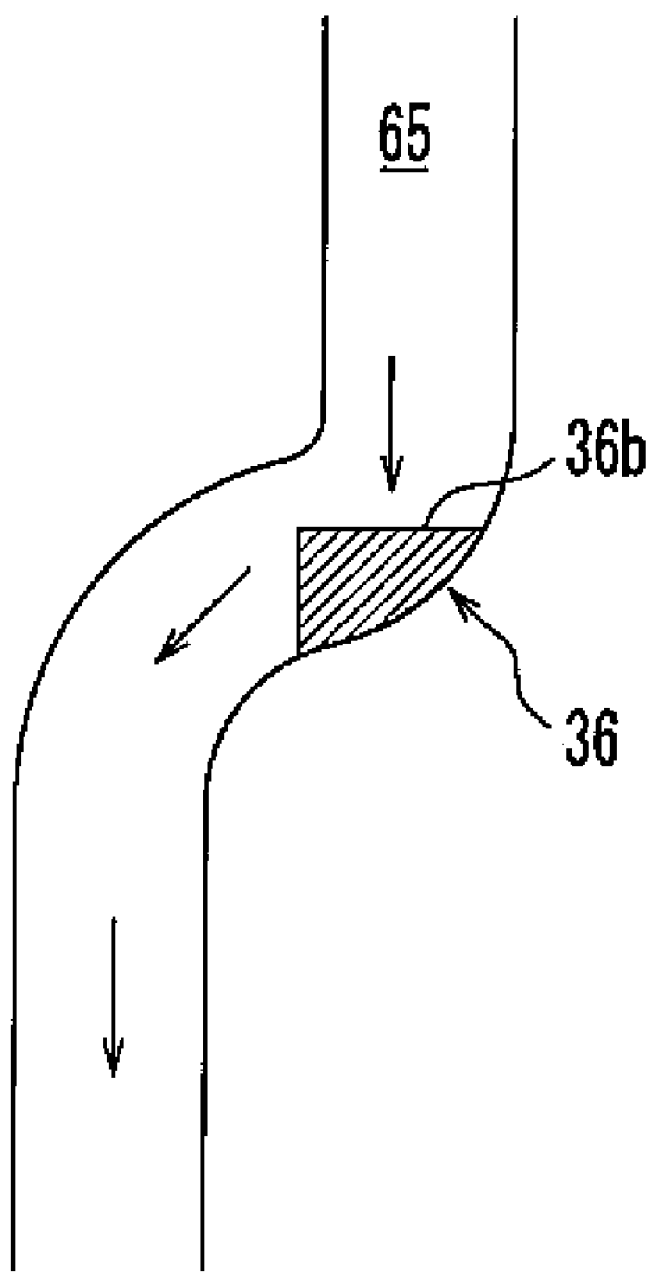
FIG. 16 schematically illustrates a position of a sound absorbing member according to a modified example 3.

As illustrated in FIG. 16, a sound absorbing member 36 may be attached to an inner wall of an exhaust passage 65 having plural curved portions and extending in a zigzag line. In this case, sound absorbing member 36 preferably has a sound absorbing surface 36b extending substantially in the vertical direction with respect to the extending direction of the portion of exhaust passage 65 upstream from sound absorbing member 36. In this case, high-frequency sound having high rectilinear propagation is effectively absorbed by absorbing surface 36b.

Figure 17:
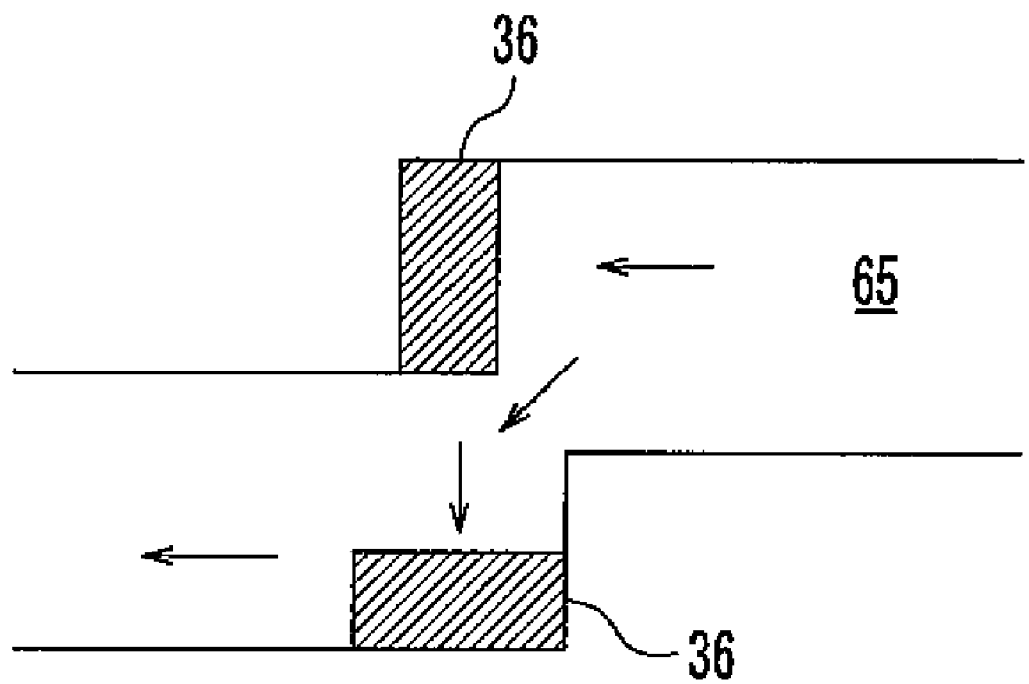
FIG. 17 schematically illustrates positions of sound absorbing members according to a modified example 4.

As illustrated in FIG. 17, a sound absorbing member 36 may be provided on each plural bended portion formed in exhaust passage 65. Plural sound absorbing members 36 thus attached effectively absorb sound high-frequency sound.

The invention is applicable to a belt-type continuously variable transmission and a motorcycle.

While particular embodiments of the invention have been described, it should be understood that these embodiments are exemplary, and not restrictive. Various modifications will be apparent to those of skill in the art and are within the scope of the present invention as set forth in the following claims.

The invention claimed is:

1. A belt-type continuously variable transmission comprising:
   a primary sheave;
   a secondary sheave;
   a resin block belt wound around the primary and secondary sheaves; and
   a transmission case that defines a belt chamber accommodating the primary sheave, the secondary sheave, and the resin block belt; wherein
   the transmission case comprises:
      an air passage connecting an inside and an outside of the belt chamber; and
      at least one sound absorbing member attached to an inner wall of the air passage such that a sound wave traveling from the inside toward the outside of the belt chamber collides with the at least one sound absorbing member; wherein
      the at least one sound absorbing member extends along the inner wall for less than an entire circumferential surface of the inner wall;
      the at least one sound absorbing member does not extend across a cross-section of the air passage to an opposite side of the inner wall;
      the air passage includes a bent or a curved portion; and
      the at least one sound absorbing member is disposed only on one side of the inner wall at the bent or curved portion where the sound wave collides with the at least one sound absorbing member.

2. The belt-type continuously variable transmission according to claim 1, wherein the air passage is an exhaust passage.

3. The belt-type continuously variable transmission according to claim 2, wherein the transmission case further comprises:
   an intake passage communicating with the belt chamber; and
   an air filter disposed in the intake passage to transmit air passing through the intake passage.

4. The belt-type continuously variable transmission according to claim 1, further comprising:
   an engine; and
   a crank case accommodating the engine, wherein
   the transmission case is attached to a side surface of the crank case to define a section of the air passage between the transmission case and the crank case; and
   the transmission case includes a communication opening through which the belt chamber and the air passage communicate.

5. The belt-type continuously variable transmission according to claim 4, wherein the transmission case further comprises:
   an outside case;
   an inside case shifted toward the crank case from the outside case such that the belt chamber is defined by the inside case and the outside case and the air passage is defined by the inside case and the crank case; and
   a linear convex rib extending in an extending direction of the air passage and projecting toward the inside case provided on the crank case within the air passage.

6. The belt-type continuously variable transmission according to claim 5, wherein the linear convex rib contacts the inside case.

7. The belt-type continuously variable transmission according to claim 5, wherein there are a plurality of the linear convex ribs.

8. The belt-type continuously variable transmission according to claim 4, wherein the transmission case includes a lower expanding portion disposed below the opening of the air passage and expanding to a position outside the air passage in a front view.

9. The belt-type continuously variable transmission according to claim 4, wherein:
   the air passage is positioned behind a center of the primary sheave; and
   the crank case includes a front expanding portion which is disposed before the air passage, expands to a position below the opening of the air passage, and expands to a position outside the air passage in a front view.

10. A motorcycle comprising the belt-type continuously variable transmission according to claim 1.

11. The motorcycle according to claim 10, wherein a center of the secondary sheave is positioned above a center of the primary sheave.

12. The belt-type continuously variable transmission according to claim 1, wherein the air passage includes a plurality of curved portions and extends in a zigzag line.

13. The belt-type continuously variable transmission according to claim 1, wherein the air passage includes a plurality of bent portions, the at least one sound absorbing member includes a plurality of the sound absorbing members, and the plurality of the sound absorbing members are provided on the plurality of bent portions such that the plurality of the sound absorbing members are discontinuous and spaced apart from each other.

14. The belt-type continuously variable transmission according to claim 1, wherein the at least one sound absorbing member is disposed only on a portion of the air passage where a main flow of air and the sound wave traveling through the air passage would collide with the sound absorbing member.

* * * * *